S. D. MILLS AND H. PAUL.
AUTOMOBILE TIRE FILLER.
APPLICATION FILED DEC. 2, 1919.
1,396,648. Patented Nov. 8, 1921.
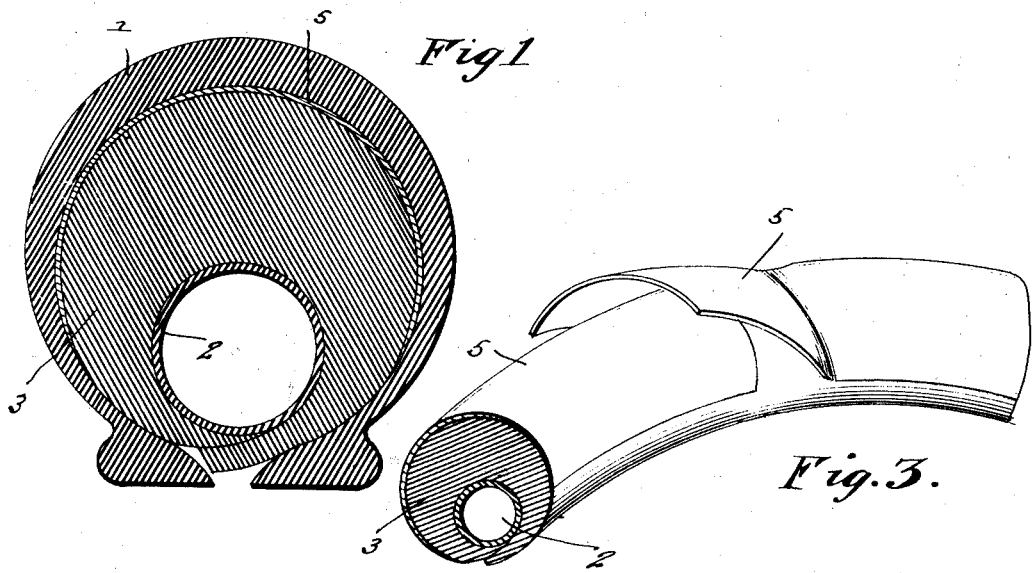
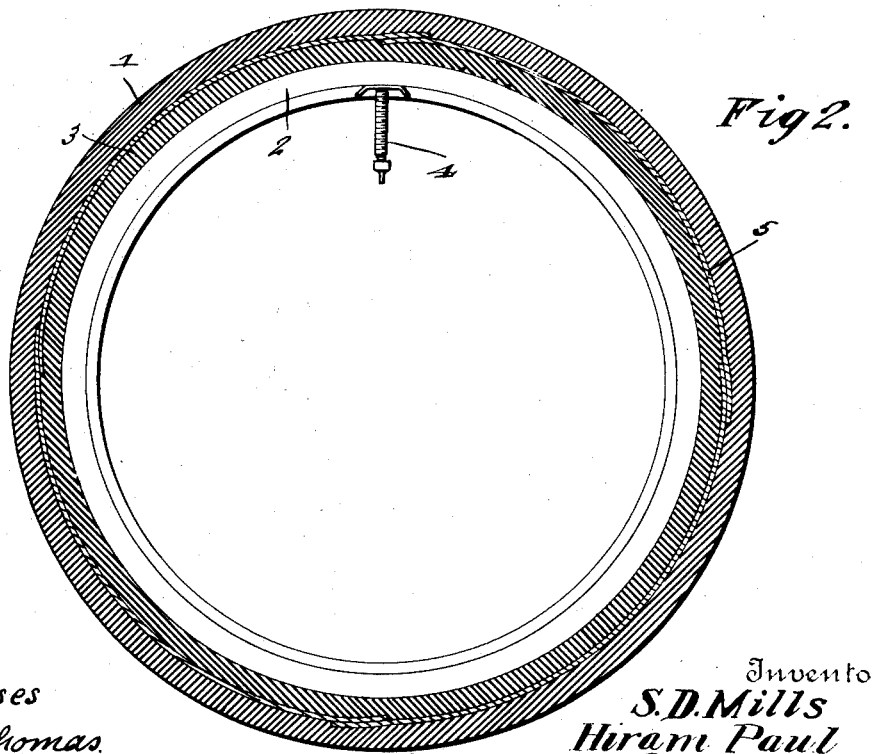
Witnesses
R. A. Thomas.
Inventor
S. D. Mills
Hiram Paul
By Victor J. Evans
Attorney

UNITED STATES PATENT OFFICE.

STEPHEN D. MILLS AND HIRAM PAUL, OF OKLAHOMA, OKLAHOMA.

AUTOMOBILE-TIRE FILLER.

1,396,648.  Specification of Letters Patent.  Patented Nov. 8, 1921.

Application filed December 2, 1919. Serial No. 341,845.

*To all whom it may concern:*

Be it known that we, STEPHEN D. MILLS and HIRAM PAUL, citizens of the United States, residing at Oklahoma, in the county of Oklahoma and State of Oklahoma, have invented new and useful Improvements in Automobile-Tire Fillers, of which the following is a specification.

This invention relates to automobile tires and the principal object of the invention is to provide a filler including a small pneumatic tube for holding the ordinary casing in expanded condition, the tube being located adjacent the inner part of the casing with the filler surrounding the same, thus preventing punctures and blowouts.

Another object of the invention is to provide a canvas casing for the filler made in sections so as to permit the same to expand.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a cross section of a tire constructed in accordance with our invention.

Fig. 2 is a longitudinal sectional view.

Fig. 3 is a view showing how the ends of the canvas cover are arranged.

In these views 1 indicates the casing which may be of any desired type, said casing being ordinarily kept in expanded condition by an inner tube. In carrying out our invention we substitute for this inner tube a filler consisting of a small tube 2 and a body 3 of a composition of rubber and other material or spongy rubber. The tube is placed adjacent the inner circumference of the body so that it will be protected by said body when the filler is placed in the casing. The tube occupies a recess formed in said body and the tube is entirely inclosed by the body as the walls of the inner circumference of said body are extended to form flaps which will overlap to inclose the tube. This tube is provided with the ordinary air valve 4 which extends through the body between the parts of the casing and through the opening in the wheel rim and is adapted to receive the ordinary inflating means whereby the tube may be inflated. When the tube is inflated it will cause the body to expand and thus act against the inner walls of the casing and hold the same in expanded condition.

As the body surrounds the tube it will be seen that it is practically impossible for said tube to be punctured or to blow out.

We provide a canvas cover 5 for the filler and this cover is made in sections. Each section is suitably fastened to the body but one end of each section is free of the body and is adapted to overlap the adjacent end of the next section. In this way the body may expand freely without interference on the part of the canvas cover.

Our filler can be placed in the casing and handled the same as an ordinary inner tube. It may be removed from one casing and inserted in another one and the operation of placing the filler in the casing and removing it therefrom does not require the use of any special form of tool.

By the use of the canvas cover the filler may be placed in an old casing, the walls of which are weakened, as the canvas cover will act as a reliner and prevent the body of soft rubber from being forced through holes in the casing.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A filler for automobile casings of the character described comprising a body of soft rubber having an annular recess therein adjacent its inner circumference, a small pneumatic tube removably seated in said recess, an air valve extending through the body between the parts of the casing and through the opening in the wheel rim and adapted to receive the ordinary inflating means whereby the tube may be inflated, a canvas cover provided for the filler and separated into sections, each section being suitably fastened to the body and having one end free of the body and adapted to overlap the adjacent end of the next section.

In testimony whereof we affix our signatures.

STEPHEN D. MILLS.
HIRAM PAUL.